2,848,501

PROTECTION OF GLYCOL ETHERS BY HYDRAZINE

William G. Lloyd, Bay City, Mich., assignor to The Dow Chemical Company, Midland, Mich., a corporation of Delaware No Drawing. Application November 12, 1954
Serial No. 468,535

3 Claims. (Cl. 260—611.5)

This invention relates to protecting liquid glycols against oxidative attack using hydrazine as a stabilizer.

Glycol compounds tend to decompose on heating or on prolonged exposure to air, forming acids and other decomposition products. For some purposes this behavior is not serious, in that the decomposition products are either volatile or are soluble in the initial glycol compound and hence form no gummy deposits or sludge. For other purposes, however, the development of even a small amount of acidity accompanying decomposition cannot be tolerated.

It is therefore an object of this invention to stabilize liquid glycol compounds against the decomposition which occurs slowly on prolonged storage and more rapidly at elevated temperatures. More particularly, it is an object of this invention to inhibit oxidative attack of diethylene glycol by molecular oxygen and thereby to suppress or prevent entirely the formation of acids in the glycol.

This invention is based on the discovery that hydrazine is highly effective in stabilizing glycol compounds against decomposition.

The glycol compounds which are stabilized according to the invention are the mono-, di-, tri-, and poly-olefin glycols formed from at least one olefin epoxide of the group consisting of ethylene oxide, 1,2-propylene oxide, 1,2-butylene oxide, and 2,3-butylene oxide, and the lower alkyl mono- and di-ethers of said glycols. These glycol compounds are therefore diols and ethers of diols, said diols corresponding to the general formula:

$$H(OC_nH_{2n})_mOH$$

wherein $n$ is an integer from 2 to 4 inclusive and $m$ is an integer from 1 to 100 or more. They are usually prepared by the auto-condensation of an alkylene oxide, or mixture of oxides, in the presence of an alkali. The ethers of glycol compounds are ordinarily prepared by condensing one or more alkylene oxides, usually of from 2 to 4 carbon atoms per molecule, with a lower aliphatic alcohol having no more than 8 carbon atoms in the molecule, e. g. methanol, ethanol, n-butanol, n-hexanol, and iso-octanol. The condensates may, if desired, be further and even completely etherified by reaction with an aliphatic alkylating agent, e. g. a dialkyl sulfate. All the glycol compounds just characterized are known substances and are capable of being stabilized according to the invention.

In stabilizing these glycol compounds with hydrazine, it is necessary only to incorporate a small but effective portion of hydrazine in the compound to be protected. Dissolution is readily brought about by stirring at ordinary temperature. The proportion of hydrazine to be maintained in the glycol compound is usually small but should at all times be equal to at least one millimole of hydrazine per mole of the glycol compound, e. g. greater than about .05 percent, and preferably greater than 0.1 percent, by weight of hydrazine based on the glycol compound. To protect the glycol compound under most conditions of oxidative attack, a minor proportion of hydrazine in a concentration of from 0.5 to 2 percent by weight is usually maintained therein, although hydrazine concentrations on up to 5 or 10 percent by weight or higher may be used.

The hydrazine-containing glycol compounds according to the invention exhibit good stability during storage and prolonged exposure to air, even at elevated temperatures above 200° F. Marked stabilization may sometimes be obtained at temperatures as high as 400° F. when the glycol undergoing heating is kept in a closed system so as to retain the hydrazine. Such high temperature stabilization is desirable when glycol compounds are subjected to purification by fractionating reflux, for example, when distilling diethylene glycol or when distilling away from diethylene glycol, lower boiling materials, such as benzene or toluene, which have been selectively absorbed therein.

The following examples illustrate that hydrazine, both in its anhydrous and hydrated form, is an effective oxidation inhibitor for glycols.

EXAMPLE 1

The efficacy with which hydrazine protects glycols against air oxidation is clearly demonstrated by the following test.

To diethylene glycol of high purity known to undergo spontaneous autoxidation at 75° C., there was added 0.12 weight percent hydrazine. A sample of the inhibited glycol weighing 32.6 grams was heated with an equal volume of air in a closed glass tube at 120° C. for one week. Thereafter the tube was cooled, opened, and its liquid contents withdrawn. Upon analysis, there was found to be only 0.04 milliequivalent of total acids present in the test-sample of diethylene glycol.

EXAMPLE 2

That the hydrate of hydrazine will also protect diethylene glycol from air oxidation is clearly demonstrated by the following tests.

Four 24 hour tests were carried out using high purity diethylene glycol. In tests 1 and 2, the diethylene glycol was employed per se. For the other two tests, however, the diethylene glycol was inhibited with a 42 weight percent water solution of hydrazine hydrate. In test 3 was used a solution of 4.00 ml. of the 42 weight percent aqueous hydrazine hydrate in 100 ml. of diethylene glycol. In test 4, a solution of 2.00 ml. of the same aqueous hydrazine hydrate in 98 ml. of diethylene glycol was used. Each of the tests was carried out by placing 100 ml. of the test-sample into a 250 ml. reflux flask, immersing the flask in a heat transfer liquid maintained at a temperature of 350° F., and bubbling a metered stream of air into the test-sample through a glass frit. The exit gas, after passing through the water-cooled condenser of the reflux flask, was bubbled into a 0.1 normal aqueous solution of sodium hydroxide to absorb the acids therefrom. Upon completion of the tests, the total acids in each of the diethylene glycol test-samples and the scrubbing solutions were determined.

The data for these tests are contained in Table I, column 1 of which gives the test number and column 2, the total volume of air in standard cubic feet passed through the glycol test samples. Column 3, gives the total amount of acids expressed in milliequivalents per liter of diethylene glycol, formed during each test.

Table 1

| Test Number | Volume of Air, s. c. f. | Amount of Acids, meq./liter |
|---|---|---|
| 1 | 0.174 | 104 |
| 2 | 0.316 | 188 |
| 3 | 0.184 | 5 |
| 4 | 0.258 | 8 |

In the following claims, the term hydrazine is inclusive of the hydrate thereof.

That which is claimed is:

1. Glycol compounds of the class consisting of liquid diols, corresponding to the formula:

$$H(OC_nH_{2n})_mOH$$

wherein $n$ is an integer from 2 to 4 inclusive and $m$ is an integer from 1 to 100, and the lower alkyl mono- and di-ethers thereof containing a small proportion of hydrazine sufficient to repress oxidative decomposition of the glycol compound on heating.

2. As a composition of matter diethylene glycol containing a minor proportion of hydrazine.

3. In a process wherein liquid diethylene glycol is heated in contact with air at an elevated temperature and thereby subjected to accelerated oxidative attack, the improvement which comprises continuously maintaining from about 0.1 to about 10 percent by weight of hydrazine dissolved in the diethylene glycol.

References Cited in the file of this patent

UNITED STATES PATENTS

| | | |
|---|---|---|
| 1,973,724 | Perkins et al. | Sept. 18, 1934 |
| 2,570,269 | Parker | Oct. 9, 1951 |
| 2,687,377 | Stewart et al. | Aug. 24, 1954 |
| 2,729,960 | Oldenburg | Jan. 3, 1956 |

FOREIGN PATENTS

| | | |
|---|---|---|
| 670,502 | Great Britain | Apr. 23, 1953 |